United States Patent
Wipasuramonton et al.

(10) Patent No.: US 6,749,220 B1
(45) Date of Patent: Jun. 15, 2004

(54) AIR BAG AND METHOD OF CONSTRUCTION

(75) Inventors: Pongdet P. Wipasuramonton, Rochester, MI (US); Charles S. E. Walczak, Warren, MI (US); Mark O. Olson, Farmington Hills, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 09/785,856

(22) Filed: Feb. 16, 2001

(51) Int. Cl.[7] .............................................. B60R 21/16
(52) U.S. Cl. ............................. 280/743.1; 280/728.1; 280/730.2
(58) Field of Search ......................... 280/728.1, 729, 280/730.1, 730.2, 743.1, 743.2

(56) References Cited

U.S. PATENT DOCUMENTS

| | | | |
|---|---|---|---|
| 2,576,324 A | | 11/1951 | Wirt |
| 2,624,886 A | | 1/1953 | Herman |
| 3,762,351 A | | 10/1973 | Jager |
| 4,530,868 A | | 7/1985 | Shinmi et al. |
| 4,593,418 A | | 6/1986 | Simon |
| 5,114,180 A | | 5/1992 | Kami et al. |
| 5,193,847 A | | 3/1993 | Nakayama |
| 5,375,878 A | * | 12/1994 | Ellerbrok ................ 139/35 |
| 5,454,595 A | * | 10/1995 | Olson et al. ............. 280/729 |
| 5,538,280 A | * | 7/1996 | Gray et al. ............. 280/743.1 |
| 5,566,977 A | * | 10/1996 | Wipasuramonton ....... 280/730.2 |
| 5,685,347 A | * | 11/1997 | Graham et al. ............. 139/390 |
| 5,765,863 A | * | 6/1998 | Storey et al. ................ 280/729 |
| 5,782,489 A | | 7/1998 | LaLonde et al. |
| 5,826,905 A | * | 10/1998 | Tochacek et al. ............ 156/148 |
| 5,909,895 A | | 6/1999 | Iino et al. |
| 5,945,185 A | | 8/1999 | Hirai et al. |
| 6,056,316 A | * | 5/2000 | Yamaji et al. ............. 280/730.1 |
| 6,113,141 A | | 9/2000 | Baker |
| 6,129,377 A | * | 10/2000 | Okumura et al. ........ 280/730.2 |
| 6,177,365 B1 | * | 1/2001 | Li |
| 6,220,625 B1 | * | 4/2001 | Wallner et al. ............. 280/729 |
| 6,220,629 B1 | * | 4/2001 | Wipasuramonton et al. ..... 280/743.1 |

FOREIGN PATENT DOCUMENTS

| | | | | |
|---|---|---|---|---|
| JP | 10129380 A | | 5/1998 | |
| JP | 10166978 A | | 6/1998 | |
| JP | 11189116 | * | 7/1999 | ............. 280/730.1 |
| JP | 70001850 | * | 3/2001 | ............. 280/730.1 |
| WO | WO/01/23219 | * | 4/2001 | ............. 280/730.1 |

* cited by examiner

Primary Examiner—Paul N. Dickson
Assistant Examiner—Toan To
(74) Attorney, Agent, or Firm—Markell Seitzman

(57) ABSTRACT

A safety apparatus including a rollover air bag to protect an occupant of a vehicle during the rolling-over of the vehicle, the rollover air bag comprising: first and second panels of woven material that has been coated on at least one side thereof to reduce the porosity of material to substantially zero, the panels sewn together along a first sewn seam to define an inflatable portion of the air bag; seam sealing means for sealing the first sewn seam so that the internal pressure of the air bag at about five (5) seconds from the time the air bag is initially inflated is about 35 Kpa (about 3.5 psi).

20 Claims, 4 Drawing Sheets

AIR BAG AND METHOD OF CONSTRUCTION

BACKGROUND AND SUMMARY OF THE INVENTION

The invention generally relates to air bags and more particularly to air bags that are required to maintain an effective internal pressure for seconds (rather than milliseconds, which is typical of conventional air bags). The invention is also related to the method of construction of these air bags. One such air bag is a rollover, curtain air bag.

The prior art is replete with air bags designed to protect the driver and the front passenger from frontal crashes. There is also a class of air bags that protect vehicle occupants when the vehicle is involved in a side impact or crash. Typically, these side air bags are located within the door or the outboard side of the seat and, when inflated, provide a barrier between the occupant and the adjacent side of the vehicle. One of the side impact types of air bags is also referred to as a curtain air bag. This type of air bag is located adjacent to the roof rail of the vehicle and, when inflated, moves downwardly along the interior surface of the vehicle side or side structure. As is known in the art, the duration of a crash event involving a frontal, side or rear crash is relatively instantaneous. Consequently, the above types of air bags are designed to be inflated and then deflate within about 100 milliseconds.

The types of material used in the above air bags are somewhat varied. The typical driver side inflator will use woven panels of material that are coated or partially coated and, most often, the rear panel includes vent openings, to accelerate the deflation of the air bag. The larger, frontal passenger side air bags, and to some extent side impact air bags, are constructed utilizing uncoated fabric; of course, the utilization of the more expensive, coated fabrics can be substituted.

A variant of the side curtain air bag (which typically spans two or more support pillars of the vehicle) has been proposed. As mentioned above, the typical side curtain air bag deflates relatively quickly, however, the use of a single air bag, which covers the pillars and the glass windows, has been proposed for use as a rollover air bag to protect the occupant's head and neck. It is known from many types of rollover tests that the rolling over of a vehicle may take many seconds to complete. As such, it is desirable to provide an air bag in which inflation gas is trapped therein for a relatively long period of time and at an acceptable pressure, which yields in essence a semi-permanent pillow or cushion to protect the occupant's head and neck.

Those skilled in the art have appreciated that one of the main sources of air bag leakage, particularly when main panels are coated, results from the many thousands of needle and thread holes created while sewing and forming outer seams of an air bag. The sewn seam can be totally eliminated by constructing a virtually or completely interwoven air bag, which is then coated on both sides to reduce to porosity of the bag. However, such construction typically requires the use of expensive and relatively slow weaving looms, such as a Jacquard head with a standard loom, and such construction is not part of the present invention.

It is an object of the present invention to provide an air bag that can be used in a rollover crash event. A further object of the present invention is to provide such a rollover air bag that is simple to construct and one that does not require expensive and exotic machinery to produce.

A further object of the present invention is to provide a rollover air bag formed by sewing two separate panels of coated material together or, alternatively, a rollover air bag formed by folding in half a single main panel of material and sewing the resulting first and second opposing halves or panels of this large main panel together, the seams constructed to retain gas for long periods of time.

Reference is made to FIG. 1, which illustrates a prior art construction of an air bag 20 formed of two facing panels of material 22 and 24. Each of the panels may include low-porosity coating, such as 26, typically formed of silicone or urethane. The panels 22 and 24, including their coating, are connected by one or more sewn seams 28. As the interior of the air bag is inflated, the panels move apart, stressing the seam. As can be appreciated, inflation gas leaks out of the air bag between the panels 22 and 24 (see arrow 30) as well as through the needle holes. The airflow through the needle holes is shown by arrows 32.

European patent EP 962363 refers to a prior art solution to gas leakage shown in FIG. 2 in which a sealant 34 is applied about the exterior of seam 28, sealing the thread and needle holes while still permitting the outflow of gas between the tensioned panels 22 and 24. The panels 22 and 24 of FIG. 2 are not shown with a non-permeable coating 26. Another prior art solution to gas migration inserts an RTV sealant 36 between the two panels 22 and 24 and then sews the panels together by a dual row of stitches (seams) 28 and 28', which is reproduced in FIG. 3. U.S. Pat. No. 5,687,986 shows a seam with increased strength in which a strip of material 38 is bent about the joined edges of the two panels 22 and 24 and sewn together; the construction is shown in FIG. 4. The use of silicone sealants interior to the panels, exterior of the panels, or some combination thereof is messy, expensive and slows the throughput of the production processes. A solution such as shown in FIG. 4 complicates the sewing process as the strip of material 38 must be positioned about the edges of both panels and sewn to the panels.

As can be appreciated, as the length of the air bag (as with a long curtain air bag) increases, the length of the sewn seam or seams, utilized to secure the panels 22 and 24 (whether coated or uncoated), increases, thereby increasing the opportunity for gas to flow through this ever increasing coupling.

Accordingly the invention comprises: a safety apparatus including a rollover air bag to protect an occupant not only during the rolling-over of the vehicle but also in side impact crashes, the air bag comprises: first and second panels of woven material that has been coated on at least one side thereof to reduce the porosity of material to substantially zero. The panels are sewn together along a first sewn seam to define an inflatable portion of the air bag. The air bag includes seam sealing means for sealing the first sewn seam so that the internal pressure of the air bag at about five (5) seconds after the air bag is initially inflated is about 20 Kpa (about 0.5 psi) or higher depending on the geometry of the cushion. In one embodiment a pressure adhesive tape is employed and in another a heat sensitive tape can be applied.

Many other objects and purposes of the invention will be clear from the following detailed description of the drawings.

BRIEF DESCRIPTION OF THE DRAWINGS

In the drawings:

FIG. 6 is a cross-sectional view through section 6—6 of FIG. 5a.

FIG. 7 is a cross-sectional view through section 7—7 of FIG. 5a.

DETAILED DESCRIPTION OF THE DRAWINGS

Figure 5A:
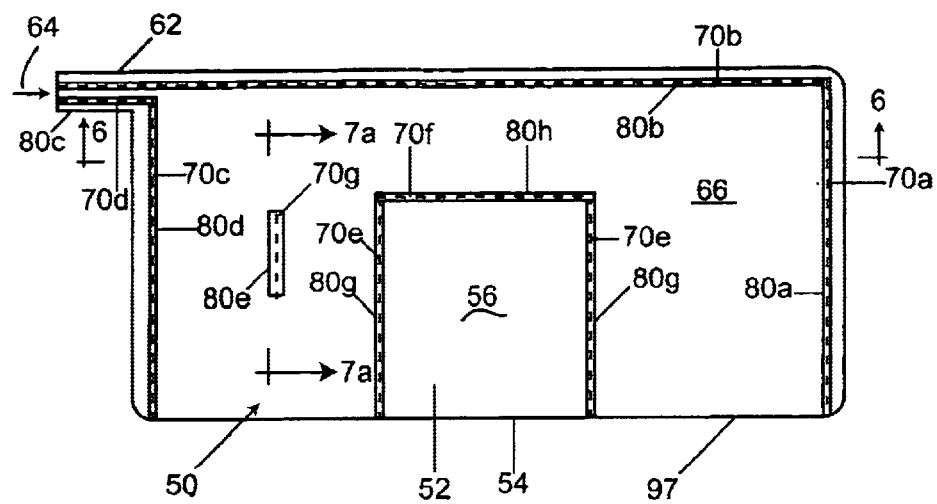
FIG. 5a is a plan view of a laid-open main panel of an air bag incorporating the present invention.
Figure 6:
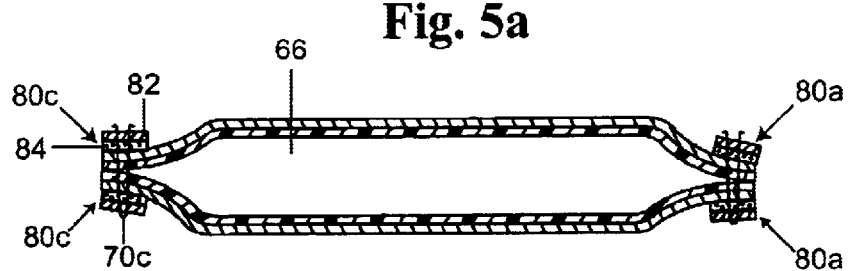
Figure 5B:
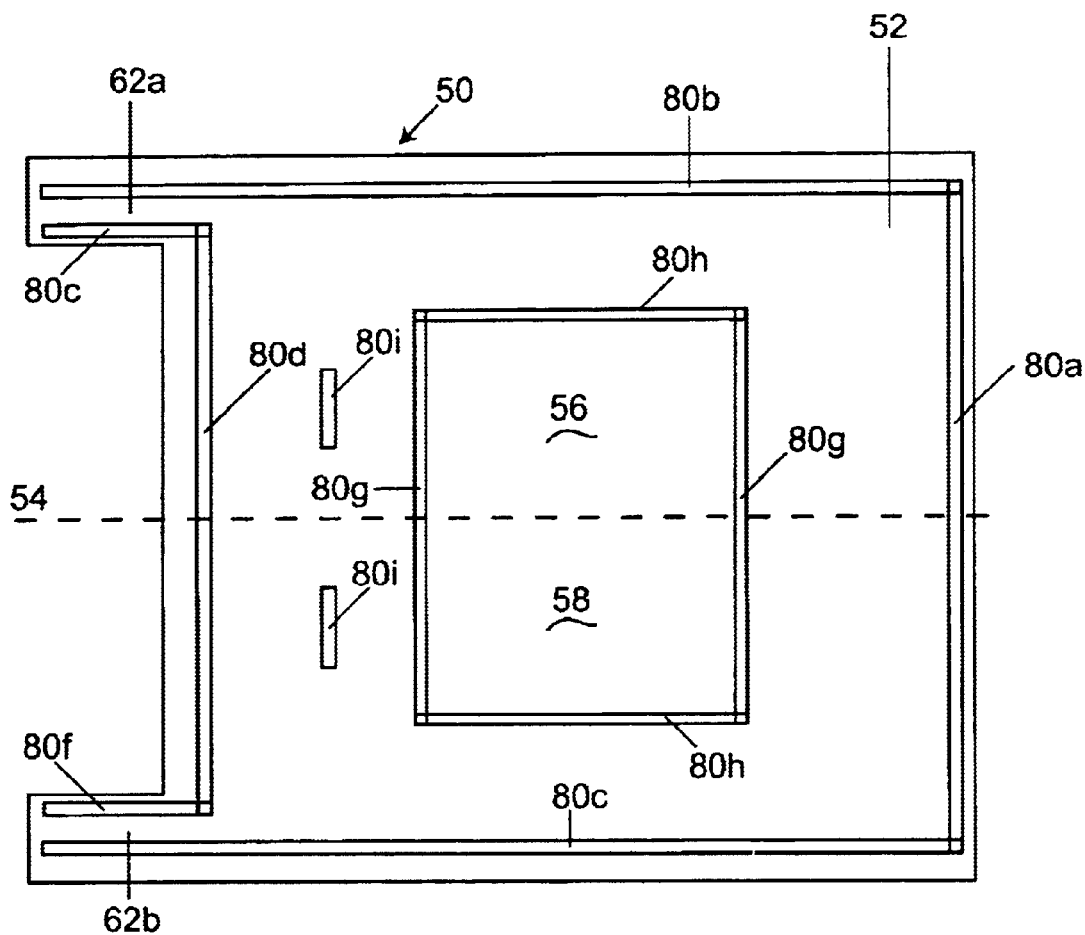
FIG. 5b is a plan view of an air bag incorporating the present invention.

FIG. 5b shows a main panel 52 that will be folded over its centerline 54 to achieve the configuration of FIG. 5a. As used herein, the upper and lower halves of the main panel are referred to as first and second or inner and outer panels 56 and 58. As can be appreciated, the air bag 50 can use separate panels 56 and 58 rather than a large main panel 52, however, by using the folded main panel at least one sewn seam is eliminated. The main panel is coated on one side with a layer of air impermeable material 60, such as silicone, urethane or neoprene. After the main panel is folded, this coated side is positioned in the interior of the air bag. The bag 50 may further include a snorkel or inlet portion 62, which can also be formed by mating opposite sections 62a, 62b of the main panel 52. The inlet, snorkel or snorkel portion 62 is adapted to receive a narrow cylindrically shaped inflator (not shown) such that inflation gas (see arrow 64 of FIG. 5a) is received into the interior, inflatable portion or cushion 66 of the air bag 50. In this embodiment, the main panel fabric is a woven 315 denier nylon having a 55×55 weave count. The fabric coating 60 is applied at a rate of approximately 37 gm/sq. mm or about 1.1 ounces per square yard or at a higher rate, keeping in mind the desired specification for the overall weight and cost of the air bag.

In the present invention, the first and second panels 56 and 58 are joined together by a plurality of stitch lines or seams designated as 70a–70d (see FIG. 5a). As appropriate, 70a and 70b can be one continuous seam and seams 70c and 70d can be another continuous seam.

Figure 8:
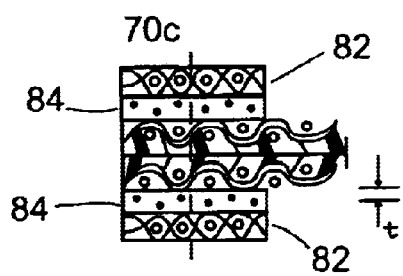
FIG. 8 is an enlarged cross-sectional view of a reinforced, sewn seam joining two panels or portions of an air bag.
Figure 9:
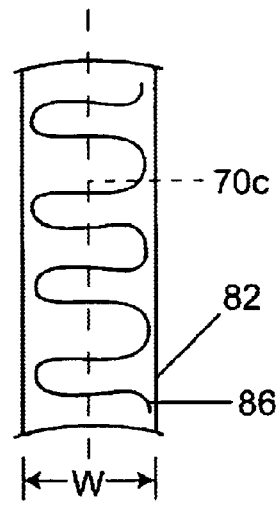
FIG. 9 is a top plan view of a segment of sealing tape.

Prior to folding the main panel and sewing the first and second panels 56 and 58 together, a pressure adhesive tape formed as one or more strips 80a–80f (see FIG. 5b) is applied to the exterior, uncoated side of the main panel 52. Rather than using individual strips the strips can be preformed as one or more integrated strips. One advantage of using the pressure sensitive tape is that no additional equipment is needed to achieve adhesion or tack between the tape and main panel. As will be seen from the description below, the tape forms a pressure a barrier to lower air leakage from the air bag. The adhesive tape may have a woven fabric 82 (see FIG. 8) or foil backing and an adhesive layer of silicone or acrylic or the like, generally shown as 84. Alternatively, a thermal adhesive fabric (made of a thermal adhesive) laminated to a coated or uncoated fabric may be used. In this case the thermal adhesive fabric is placed on the main panel and direct heat and pressure is applied to the tape to melt the thermal adhesive to secure the tape in place. Reference is briefly made to FIG. 9, which is a plan view of the woven backing or substrate 82 of one of the tape segments. As can be seen, the weft fibers 86 of the substrate run side to side and when placed on the seam, such as seam 70c, are positioned to run across the seam. A backing material of the pressure adhesive tape with the following characteristics has displayed extremely low gas leak rates. This backing material was formed of 315 denier material (but can vary between 210 to 420 denier). The weave count of the backing material was 55×55 woven fibers but may be as low as about 46×46. The adhesive thickness, t, (see FIG. 8) above the backing material is preferably at least 0.0762 mm (0.003 inch) but a thickness of 0.114 mm (0.0045 inch) or higher is preferred.

After the tape is applied to the main panel, the main panel is folded over and sewn together along each taped section 80a–80f. The respective sew seams (seam lines) 70a–70d are shown in FIG. 5a. Each sewn seam is preferably a single row of stitches; however, multi-rows of stitches can be used at a cost penalty. As can be appreciated, short seam segments can be interconnected or integrated into longer seam segments or seam units. In order to control the separation of the various panels, and hence the leak rate between these panels, the sewn seam(s) are constructed with a stitch length of about 1.5 to 2.0 mm (or a stitch count of about 12–17 stitches per inch), using a thread of 92–138 denier or higher for both the needle thread and the bobbin thread. Additionally, the thread tension of the sewing machine is controlled to a tension of at least 0.91 N (2 pounds).

Figure 7:
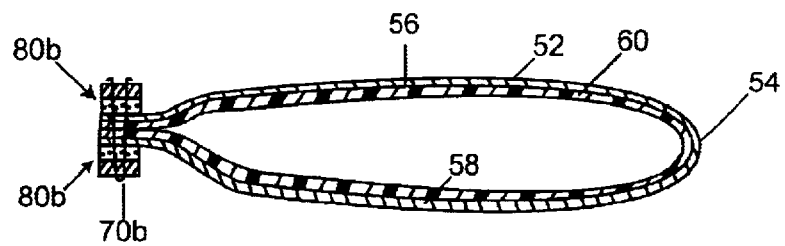
Figure 7A:
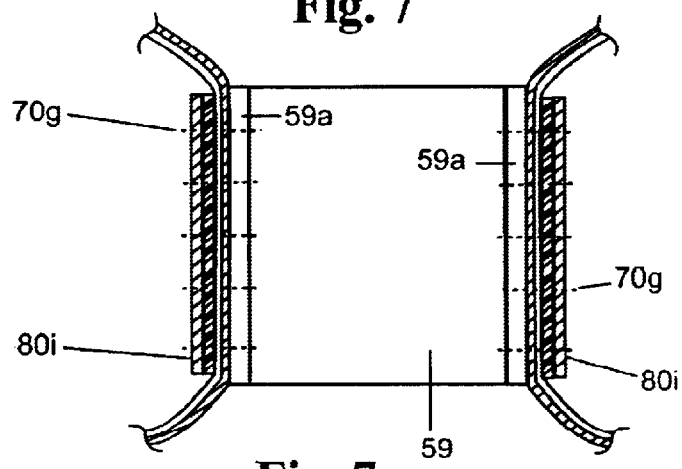
FIG. 7a is cross-sectional view showing an optional internal tether.

Depending on the size of the air bag and its intended use, it may also be desirable to use additional tape segments such as 80g and 80h (see FIG. 5b), which when the bag is folded over, will be sewn together (see seams 70e and 70f of FIG. 5a) to define one or more non-inflatable areas of the air bag in which inflation gas is prevented from entering. Still other areas of the air bag can be sewn together at determinable locations with these seams such as 70g enhanced by additional tape segments 80i. With regard to these last mentioned areas, the first and second panels can be secured directly to each other or, alternatively, an additional piece of fabric 59 (a 3-D tether) can be inserted within the bag and can extend across the panels 56 and 58 with ends 59a of this tether 59 secured by a seam, such as 70g, and enhanced with a tape strip such as 80i. The 3-D tether is shown in FIG. 7a. As can be appreciated, the tether 59 permits panels 56 and 58 to separate a determinable distance.

Reference is again briefly made to FIG. 9. In the preferred embodiment, the width of the tape segments is 12.5 mm. (0.5 inch) wide. Each of the sew seams or lines 70a–70d preferably pierces through the middle of its corresponding tape segment. With this construction, it is believed that the taped segments operate as a leaf spring by adding stiffness to the main panels, which applies a counter force to the top of the fabric resisting the separation of the air bag panels proximate each sewn thread through both panels and contributes to the low leakage.

As can be seen, the present invention is constructed using conventional sewing techniques in combination with ingenious choices and stitch count and thread tension and tape construction to achieve an air bag characterized by a surprisingly low leak rate. The present construction can be applied to any air bag to protect an occupant in any seating position of the vehicle.

Figure 10:
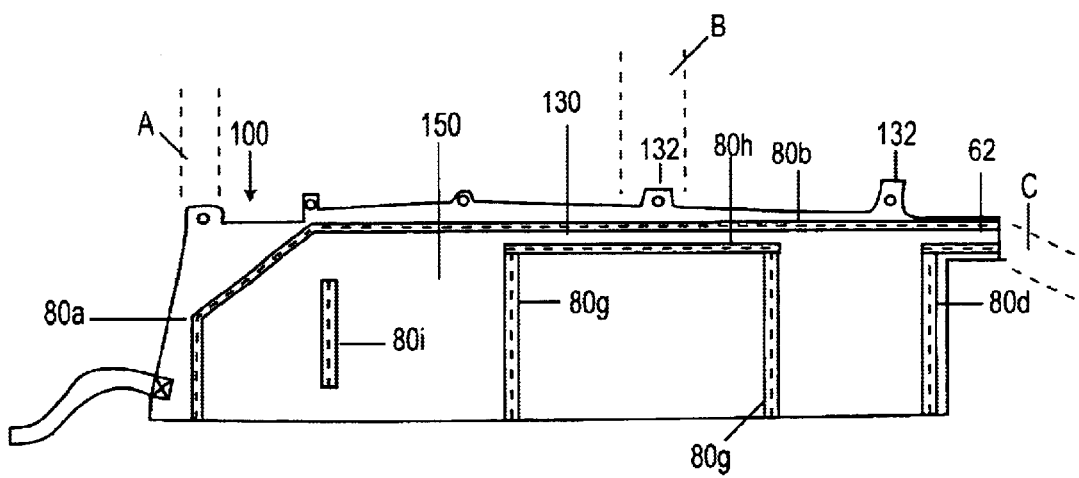
FIG. 10 is a plan view of a side curtain air bag constructed and tested utilizing the present invention.

Reference is briefly made to FIG. 10, which diagrammatically illustrates the exterior contours of a side curtain/rollover air bag constructed using the above-described seam technique and which was tested. As can be seen, in concept the air bag 100 of FIG. 10 is similar to air bag 50 of FIG. 5a and as can be appreciated the contours of the actual bag have been approximated by straight lines for illustration purposes. The inflatable volume of air bag 100 is approximately 24 L. The approximate length of sewn seams constructed about the periphery of the air bag is approximately 3.4 m. Consequently, it can be appreciated that without the present invention, this air bag would leak significantly (see graph 110 of FIG. 11). This bag 100 also uses a flexible distribution tube 130, which is inserted in through inlet 62 and extends generally across the top of the air bag 100 to distribute inflation gas to discrete portions of the bag. While not shown, this tube also includes a plurality of openings so that the gas flow can be directed to particular areas of the air bag. The bag 100 also includes a plurality of mounting tabs 132 (with openings therein), to facilitate mounting of the air bag along the roof rail of the vehicle.

Figure 11:
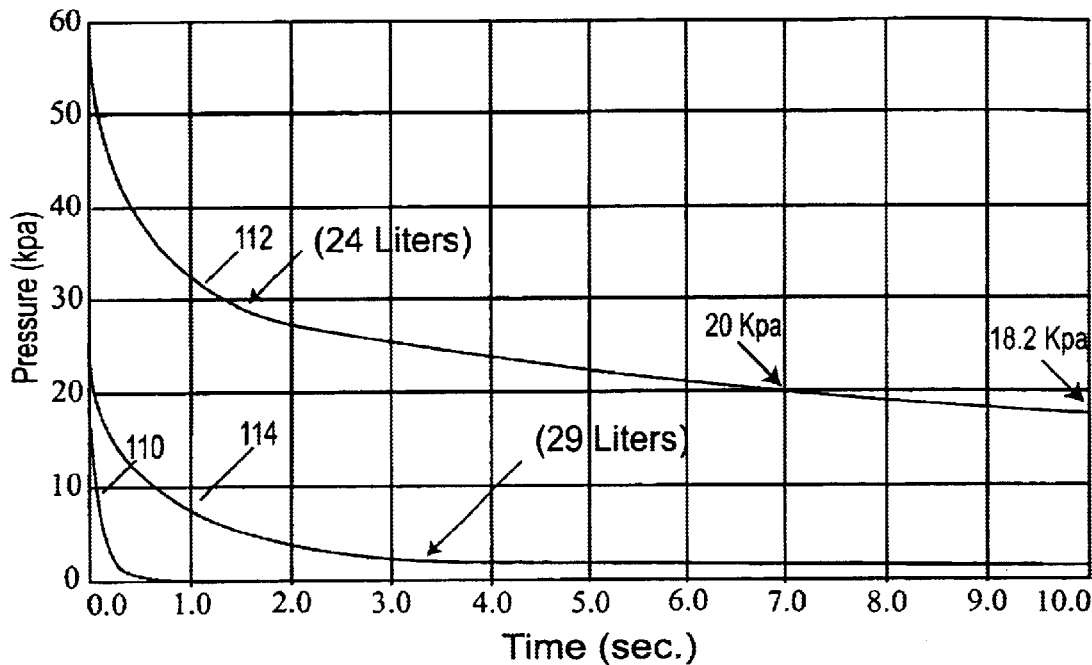
FIG. 11 is a graph showing the various pressure-time traces of actual air bag deployments.

Reference is briefly made to FIG. 11, which shows various pressure-time gradients (112 and 114) achieved with two air bags using the above construction and a third pressure-time gradient (110) of a similarly constructed bag but one that does not include the adhesive taped seams. As mentioned above, most air bags are designed to be inflated and then to deflate rapidly and this is shown in graph 110. The pressure-time gradient 112 was achieved by testing air bag 100 (constructed using the present invention). The air bag 100 was inflated by an inflator having a maximum pressure capability of 250 Kpa when tested in a 28.3 L test tank. The inflatable volume of this air bag was 24 L. As can be seen, the maximum equalized pressure was approximately 60 Kpa. Surprisingly, the residual pressure within the air bag after 7 seconds was approximately 20 Kpa (about 3 psi).

Additionally, as can be seen, the rate of pressure decrease from at least 4 seconds to approximately 9 seconds was in the vicinity of 1.2 Kpa per second. The air bag 100 is aptly suited as a rollover air bag as its residual internal pressure, many seconds after inflation, is sufficient to maintain the air bag at a state of fullness adequate to protect an occupant as the occupant may be forced one or more times into the air bag. Graph 114 show test results for a similarly constructed and sized air bag with an inflatable volume of 29 L using the inflator used in graph 112. The bag and test conditions relative to graph 110 were identical to the bag 100 used in graph 112 but none of the seams were reinforced and, as can be seen, this bag deflates relatively instantaneously and would not be suited to provide rollover protection.

Reference is again made to FIG. 10, which shows the position of air bag 100 in relationship to the A, B and C pillars of an exemplary vehicle.

In the above description, the pressure sensitive adhesive tape or alternatively the heat sensitive tape, was applied in discrete segments. This is not necessary. The tape can be rolled in a continuous strip from a dispenser and across the various corners (previously noted by the intersections of the tape segments). If the radius of the corner is small, the tape will pucker but this is not significant with the present construction.

Figure 1:
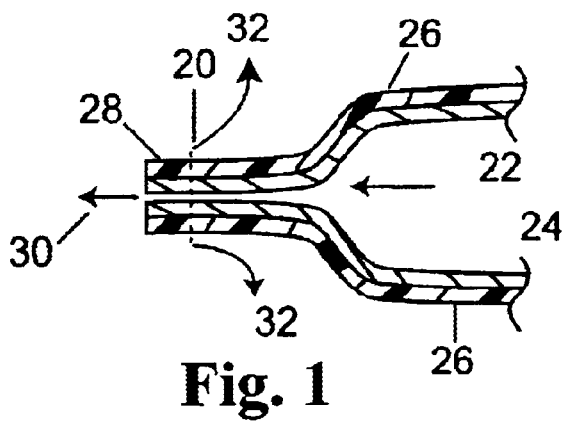
FIGS. 1–4 illustrate prior art seam constructions for air bags.
Figure 2:
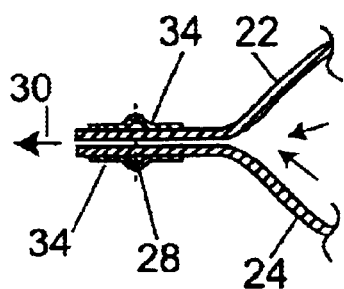
Figure 3:
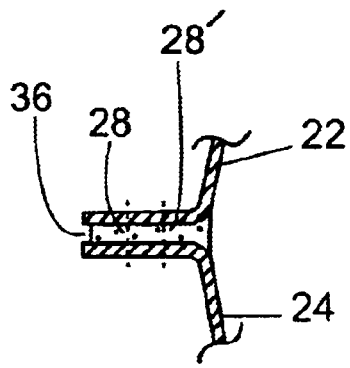
Figure 4:
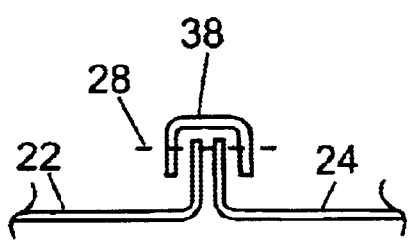
Figure 12:
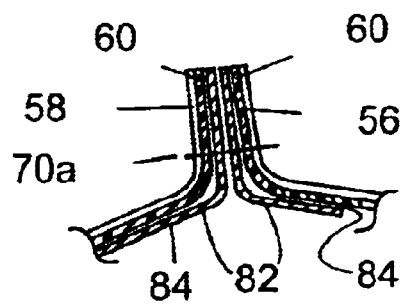
FIG. 12 shows an alternate embodiment of a seam construction.

Reference is briefly made to FIG. 12, which shows an embodiment of an alternate seam construction. In this construction, each tape or tape segment is applied to the coated, interior surface of the air bag and sewn together in the above manner.

Many changes and modifications in the above-described embodiment of the invention can, of course, be carried out without departing from the scope thereof. Accordingly, that scope is intended to be limited only by the scope of the appended claims.

What is claimed is:

1. A safety apparatus including an air bag inflatable to an initial pressure, the air bag comprising:
    an inflatable portion formed of woven material and configured with a coating to reduce the flow of inflation gas thereacross to substantially a zero flow rate; at least peripheral portions of the air bag configured to be joined along at least one path which defines the location of a corresponding first sewn seam comprising a plurality of stitches piercing corresponding first and second panels of the air bag,
    seam sealing means for sealing the stitches to control the flow of inflation gas thereacross;
    wherein the seam sealing means includes an adhesive tape applied to a surface of each of the first and second panels along the path of the at least first sewn seam wherein the first sewn seam extends through the tape and through the panel to which it is attached.

2. The apparatus as defined in claim 1 wherein the apparatus includes a source of inflation gas for initially increasing internal air bag pressure to about 18 Kpa and wherein the seam sealing means is configured to control gas leakage through the seam so the internal pressure of the bag is about 3.5 Kpa at at least five seconds after the bag is initially inflated.

3. The apparatus as defined in claim 1 wherein the apparatus includes a source of inflation gas for initially increasing internal air bag pressure to about 60 Kpa and wherein internal pressure of the bag is about 20 Kpa at at least seven seconds after the bag is initially inflated.

4. The safety apparatus as defined in claim 1 wherein the first sewn seam is configured having a predetermined thread tension and stitch length, wherein the stitch length is about 1.5 to 2.0 mm).

5. The safety apparatus as defined in claim 4 wherein the thread tension is about or greater than 0.91 N (2.0 pounds).

6. The safety apparatus as defined in claim 4 wherein the denier of the needle thread and of the bobbin thread is about or greater than 92 denier.

7. The safety apparatus as defined in claim 4 wherein the seam sealing means includes a pressure sensitive adhesive tape comprising a backing material and an adhesive coating of a predetermined thickness, wherein the adhesive thickness is at least 0.00012 mm (0.003 inch).

8. The safety apparatus as defined in claim 7 wherein the thickness of the uncoated panel material or backing material is at least 0.00012 mm (0.003 inch).

9. The safety apparatus as defined in claim 4 wherein the seam sealing means includes a pressure sensitive adhesive tape comprising a backing material and an adhesive coating of a predetermined thickness and wherein the thickness is in the range of at least 0.00012 mm (0.003 inch) to 0.000276 mm (0.007 inch) or higher.

10. The safety apparatus as defined in claim 1 wherein the weight of the material used to coat the first and second panels is about 34 grams per square millimeter.

11. The safety apparatus as defined in claim 1 wherein the weight of the material used to coat the first and second panels is in the range of about 34–57 grams per square millimeter (about 1 oz./sq. yd. to about 1.7 oz./sq. yd.).

12. The safety apparatus as defined in claim 1 wherein the first and second panels are constructed of thread with a denier of at least 315.

13. The apparatus as defined in claim 1 wherein the tape is placed on a coated side of at least one of the first and second panel.

14. The apparatus as defined in claim 1 wherein the seam sealing means includes an adhesive tape extending along the first sewn seam and located on an outside surface of at least one of the first and the second panel, wherein the first sewn seam extends through the tape, along an exterior surface of the tape and through the panel to which it is attached.

15. The apparatus as defined in claim 1 wherein the tape is applied to an outer coated surface of each of the first and second panel and wherein stitches forming the first sewn seam also extend along an exterior surface of the tape.

16. The apparatus as defined in claim 1 wherein the first sewn seam extends generally along a center line of the tape.

17. The apparatus as defined in claim 1 wherein the tape is located between facing panels of the air bag.

18. The apparatus as defined in claim 1 including additional paths located within the at least one path, these additional paths define additional seam locations along which portions of opposing panels of the air bag are configured to be joined, and wherein the seal sealing means includes additional portions of adhesive tape applied along the addition paths and wherein corresponding additional sewn seams pierce the additional portions of tape and the portions of the air bag to which the additional portions of tape are attached.

19. A safety apparatus including a rollover air bag to protect an occupant of a vehicle during the rolling-over of the vehicle, the rollover air bag comprising:
   first and second panel portions of woven material that have been coated on at least one side thereof to reduce the porosity of material to substantially zero, the panel portions configured to be sewn together sewn together along a predetermined path the coated side of the material configured to form exterior first and second panel portions;
   a sealing tape applied to the exterior first and second panel portions; and
   a sewn seam located along the predetermined path, the seam extending through the sealing tape and the panel portion to which it is attached.

20. The apparatus as defined in claim 19 wherein the apparatus includes a source of inflation gas to pressurized the air bag and wherein the sealing tape is effective to maintain the rate of pressure loss of the air bag during a time period from about 4–8 seconds from the time the air bag is inflated to be no more than 0.15 Kpa/sec.

* * * * *